G. A. JOHNSON.
SHOCK ABSORBING MECHANISM.
APPLICATION FILED MAR. 4, 1918.
1,290,217.
Patented Jan. 7, 1919.
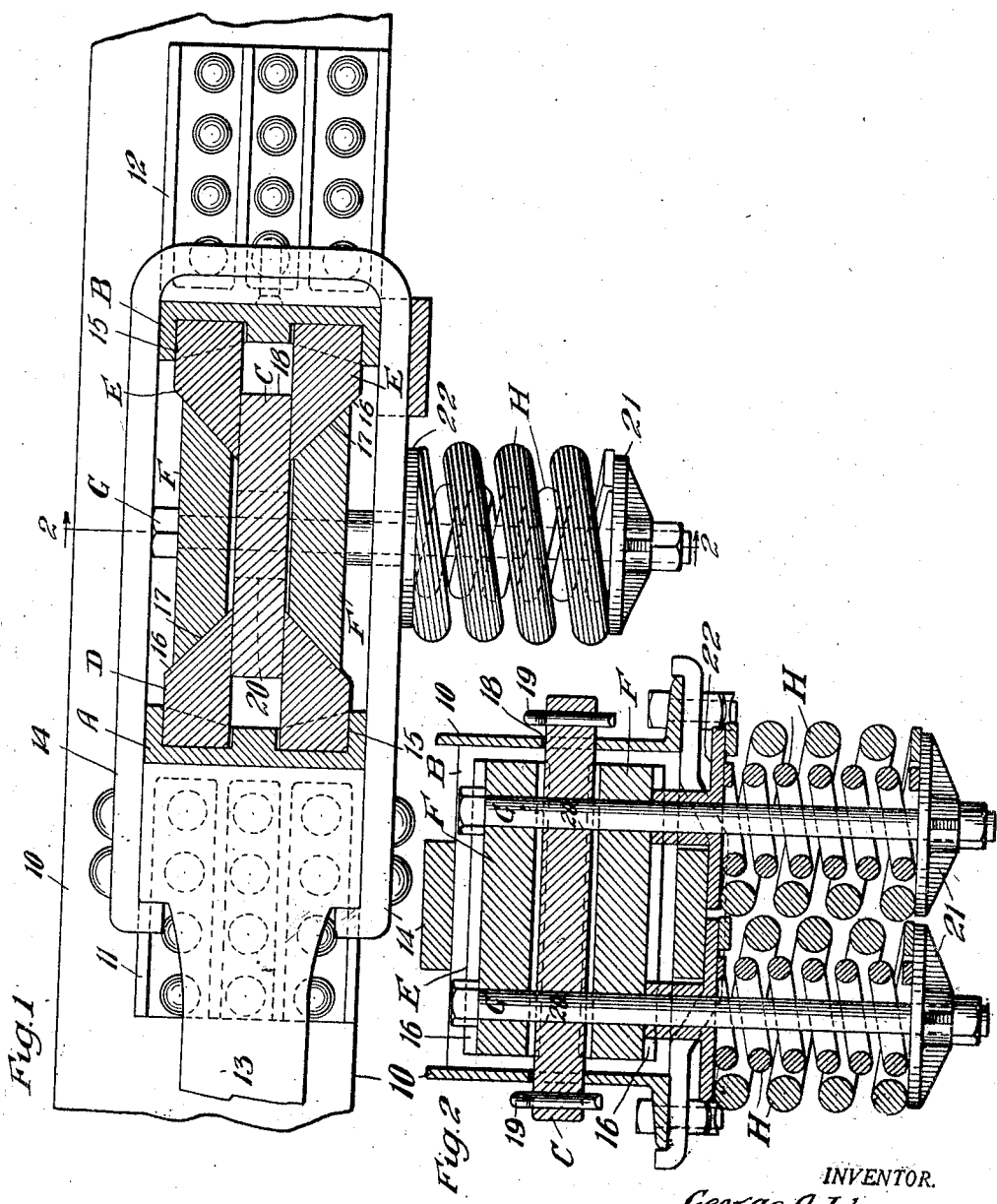
INVENTOR.
George A Johnson
BY Geo. J. Haight
ATTORNEY

UNITED STATES PATENT OFFICE.

GEORGE A. JOHNSON, OF CHICAGO, ILLINOIS, ASSIGNOR TO WILLIAM H. MINER, OF CHAZY, NEW YORK.

SHOCK-ABSORBING MECHANISM.

1,290,217.  Specification of Letters Patent.  Patented Jan. 7, 1919.

Application filed March 4, 1918. Serial No. 220,246.

*To all whom it may concern:*

Be it known that I, GEORGE A. JOHNSON, a citizen of the United States, residing at Chicago, in the county of Cook and State of Illinois, have invented a certain new and useful Improvement in Shock-Absorbing Mechanism, of which the following is a full, clear, concise, and exact description, reference being had to the accompanying drawings, forming a part of this specification.

This invention relates to improvements in shock absorbing mechanism.

The object of the invention is to provide a frictional shock absorbing mechanism, more especially adapted for railway draft riggings and wherein all the friction elements proper may be cheaply manufactured in the form of castings, the entire arrangement providing large frictional wearing areas and corresponding high capacity.

In the drawing forming a part of this specification, Figure 1 is a part side elevation, part longitudinal, vertical section of a portion of a railway draft rigging showing my improvements in connection therewith. Fig. 2 is a transverse, vertical sectional view, taken on the line 2—2 of Fig. 1.

In said drawing, 10—10 denote the channel-shaped center or draft sills of a railway car, to the inner faces of which are secured the usual front and rear stop lugs 11 and 12. The draw bar 13 is operatively connected with the draft gear proper by any suitable yoke-acting means, such as the U-shaped strap 14.

The shock absorbing mechanism, as shown, includes a front follower A, a rear follower B, a central friction member C, a front set of wedges D—D, a rear set of wedges E—E, upper and lower or side friction members F—F, a pair of bolts G—G, and springs H—H.

Each of the followers A and B is provided on its inner face with a pair of recesses or sockets 15—15 to loosely receive the corresponding ends of the wedges D—D or E—E. The sockets 15 are made slightly wider than the thickness of the wedges D—D and E—E in order to compensate for any inequalities in manufacture and permit slight adjustment of the wedges transversely of the followers due to wear on the parts.

The wedges D—D and E—E are provided on their inner ends with wedge faces 16—16 oppositely arranged, as will be clear from Fig. 1, and the ends of the lateral friction members F—F are correspondingly wedge-shaped, as indicated at 17—17.

The central friction member C is shown in the form of a wide fixed key extending through suitable slots 18—18 in the draft sills, it being understood that the friction member C is held against longitudinal movement. Its lateral displacement with respect to the sills may be prevented by any suitable means, such as the cotters 19—19.

The bolts G—G are extended vertically through suitable alined openings in the friction members C and F—F, the openings 20—20 in the central friction member C being longitudinally elongated, however, as shown in Fig. 1, in order to permit the bolt to move lengthwise relatively thereto. Each of the bolts G carries a spring H, a fixed spring follower 21 at the lower end of the spring H and a movable spring follower 22 at the upper end of the spring H. In operation, upon relative movement of the followers A and B toward each other under either buff or draft, it is evident that the relative approach of the wedges D—D and E—E will force the friction members F—F vertically apart against the action of the springs H—H. At the same time, the wedges D—D and E—E will be forced toward the center line of the gear and into frictional engagement with the central friction member C. Upon buffing movement, friction will be generated between the wedges D—D and the central member C and in draft, friction will be generated between the wedges E—E and said central member C.

All of the parts may be relatively cheaply manufactured in the form of ordinary castings; the parts may be easily assembled and replaced; and I obtain a large frictional wearing area and high capacity.

Although I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with end followers movable relatively toward each other; of end wedges movable with the respective followers; central and lateral friction members frictionally engaging with said wedges, said lateral friction members being relatively separable and at right angles to the line of movement of said followers; and means for holding said central friction member stationary.

2. In a friction shock absorbing mechanism, the combination with a pair of followers relatively movable toward each other; of wedges movable with the respective followers; a fixed central friction member, said central friction member and said wedges having coöperating friction surfaces extending parallel to the axis of the shock absorbing mechanism; additional friction members on each side of said central friction member and having frictional engagement with said wedges, said side friction members being relatively separable; and spring means for resisting separating movement of said side friction members.

3. In a friction shock absorbing mechanism, the combination with end followers movable relatively toward each other; of end wedges movable with the respective followers; a fixed central friction member coöperable with said wedges; additional friction members on each side of the central friction member and also coöperable with said wedges, the side friction members being relatively separable and at right angles to the line of movement of said followers; a bolt extending through said side friction members; a spring carried by said bolt; and spring followers mounted on the bolt, one of said spring followers engaging one of said side members and movable in unison therewith.

4. In a friction shock absorbing mechanism, the combination with end followers movable relatively toward each other; of end wedges movable with the respective followers; central and side friction members frictionally engaging with said wedges, said side friction members being relatively separable and at right angles to the line of movement of said followers, said central friction member being stationary and the wedges being restricted to rectilinear movement with respect to said central friction member; and spring means resisting the separating movements of said side friction members.

5. In a friction shock absorbing mechanism, the combination with end followers movable relatively toward each other; of a pair of inwardly extending wedges on each of said followers and detachable therefrom, the wedges of each pair being separated; a fixed central friction member extending between the wedges of each pair and frictionally engaging the latter; additional friction members on either side of said central friction member and having wedge-shaped ends coöperable with said wedges; and spring means for resisting movement of said side friction members upon relative approach of the followers.

6. In a draft rigging, the combination with draft sills, draw bar, front and rear stops, and yoke-acting means; of a shock absorbing mechanism operatively associated with said stops and yoke-acting means, said mechanism comprising front and rear followers, a pair of spaced wedges extending inwardly from each follower, a central friction member mounted in slots in said sills and held against longitudinal movement, additional friction members on either side of said central friction member and having wedge-shaped ends coöperable with said wedges, said side friction members being relatively separable in directions at right angles to the axis of the draft rigging, and a spring extending with its axis at right angles to the axis of the draft rigging and adapted to resist separating movement of said side friction members.

7. In a draft rigging for railway cars, the combination with draft sills having front and rear stops, a draw bar, and yoke-acting means; of a friction shock absorbing mechanism operatively associated with the draw bar and yoke-acting means, said mechanism including front and rear followers, a pair of inwardly extending wedges detachably mounted on each of said followers, the wedges of each pair being spaced, a central friction member mounted between the wedges of each pair, means for holding said central friction member against longitudinal movement, additional friction members on each side of the central friction member and engaging with said wedges, and spring means for resisting relative approach of said followers and acting through the additional friction members on each side of the central friction member.

In witness that I claim the foregoing I have hereunto subscribed my name this 14th day of Feb., 1918.

GEORGE A. JOHNSON.